United States Patent
Yadav et al.

(10) Patent No.: US 9,862,829 B2
(45) Date of Patent: Jan. 9, 2018

(54) HYBRID MODIFIED BITUMEN COMPOSITION AND PROCESS OF PREPARATION THEREOF

(71) Applicant: Indian Oil Corporation Limited, Bandra (East), Mumbai (IN)

(72) Inventors: Veena Yadav, Haryana (IN); Rajender Singh Negi, Haryana (IN); Dhanesh Kumar, Haryana (IN); Naduhatty Selai Raman, Haryana (IN); Anurag Ateet Gupta, Haryana (IN); Biswapriya Das, Haryana (IN); Ravinder Kumar Malhotra, Haryana (IN)

(73) Assignee: INDIAN OIL CORPORATION LIMITED, Bandra (East) (IN)

( * ) Notice: Subject to any disclaimer, the term of this patent is extended or adjusted under 35 U.S.C. 154(b) by 147 days.

(21) Appl. No.: 14/807,174

(22) Filed: Jul. 23, 2015

(65) Prior Publication Data

US 2016/0024306 A1 Jan. 28, 2016

(30) Foreign Application Priority Data

Jul. 23, 2014 (IN) .......................... 2380/MUM/2014

(51) Int. Cl.
*C08L 95/00* (2006.01)
*C08L 17/00* (2006.01)
*C08K 5/16* (2006.01)
*C08L 33/06* (2006.01)

(52) U.S. Cl.
CPC .............. *C08L 95/00* (2013.01); *C08L 17/00* (2013.01); *C08L 33/06* (2013.01); *C08L 2555/22* (2013.01); *C08L 2555/34* (2013.01); *C08L 2555/60* (2013.01); *C08L 2555/80* (2013.01)

(58) Field of Classification Search
CPC ...... C08L 95/00; C08L 17/00; C08L 2555/22; C08L 2555/60; C08L 2555/80; C08L 2555/34; C08L 33/06; C08L 33/08; C08L 33/10; C08K 5/16
See application file for complete search history.

(56) References Cited

U.S. PATENT DOCUMENTS

| | | | | |
|---|---|---|---|---|
| 4,485,201 A * | 11/1984 | Davis | ...................... | C08L 95/00 428/63 |
| 6,210,564 B1 * | 4/2001 | Brons | .................. | C10G 19/073 208/208 M |
| 7,446,139 B2 | 11/2008 | Martin | | |
| 2016/0017149 A1 * | 1/2016 | Yadav | ..................... | C08L 95/00 524/64 |

FOREIGN PATENT DOCUMENTS

| | | | |
|---|---|---|---|
| EP | 0305225 | 3/1989 | |
| EP | 2055745 A1 * | 5/2009 | ............. C08L 95/00 |
| WO | WO 1986/04090 | 7/1986 | |
| WO | WO 1999/27018 | 6/1999 | |
| WO | WO 2010023173 | 3/2010 | |

* cited by examiner

*Primary Examiner* — Karuna P Reddy
(74) *Attorney, Agent, or Firm* — Workman Nydegger

(57) ABSTRACT

The present invention relates to a hybrid modified bitumen composition containing functionalized polymer, crumb rubber and a dual functional agent. The present invention also relates to a process of preparation of hybrid modified bitumen composition containing functionalized polymer, crumb rubber and a dual functional agent.

11 Claims, No Drawings

HYBRID MODIFIED BITUMEN COMPOSITION AND PROCESS OF PREPARATION THEREOF

FIELD OF THE INVENTION

The present invention relates to a hybrid modified bitumen composition containing functionalized polymer, crumb rubber or synthetic rubber and a dual functional agent. The present invention also relates to a process of preparation of hybrid modified bitumen composition containing functionalized polymer, crumb rubber and a dual functional agent.

BACKGROUND OF THE INVENTION

Bitumen modification by polymer is known in literature to produce polymer modified bitumen with enhanced rheological properties but production of all grades of polymer modified bitumen from petroleum vacuum residue is neither feasible nor cost effective.

Crumb rubber modification has been proven to enhance the properties of pure bitumen but crumb rubber modified bitumen has inherent issue of storage stability causing difficulty in transportation. There are two general methods for incorporating crumb rubber in asphalt. One is called dry method, where crumb rubber is directly incorporated in bituminous mixture. Another method is called wet method, where the crumb rubber is first incorporated in the asphalt and then in to the bituminous mixture.

Following wet method, several compositions have been developed in prior art for incorporation of crumb rubber in asphalt along with polymer to enhance storage stability and rheological properties of asphalt. European Patent EP0305225 discloses a manufacturing method which improves the stability of a composition: bitumen, crumb rubber, aromatic oil and elastomer as catalyst of said process, from 6 hours to ten days.

EP 2315803A1 discloses a bitumen composition comprising crumb rubber, a polymer comprising glycidyl functional groups and wax. U.S. Pat. No. 7,446,139 B2 discloses the modified asphalt binders comprising neat asphalt, crumb rubber, one or more synthetic polymers and one or more acid. EP 2055745 discloses the composition comprising bitumen, crumb rubber, a polymer which can be vulcanized and vulcanizing agent. WO 9927018 also discloses compositions wherein polymers of various types are used to improve the stability to storage of the bitumen crumb rubber.

The existing prior arts have not disclosed on the production of hybrid bitumen from vacuum. The present invention discloses production of hybrid bitumen from vacuum residue using dual functional agent which may react with crumb rubber leading to enhance storage stability of hybrid modified bitumen in one aspect and in another way it increase the hardening of bitumen which further improves the rheological properties of asphalt effectively.

SUMMARY OF THE INVENTION

The present invention relates to a hybrid modified bitumen composition comprising a petroleum vacuum residue, crumb rubber or synthetic rubber, a dual functional agent and a functionalized polymer. In an embodiment, the petroleum vacuum residue is produced from high sulphur crude or low sulphur crude or mixture thereof. In another embodiment, the petroleum vacuum residue comprises asphalt/bitumen having a penetration in the range of 50 to 150 dmm. Preferably, the vacuum residue has a penetration range in the range of 70 to 150 dmm.

In an embodiment of the invention, crumb rubber or synthetic rubber is in the range of 1 to 20% by weight of the hybrid modified bitumen composition. In a preferred embodiment, the crumb rubber comprises polyisoprene. The dual functional agent comprises nitrogen containing hetero ring annulated reactive aromatic hydrocarbons having high melting point in the range of 140 to 160° C. The nitrogen containing hetero ring annulated reactive aromatic hydrocarbon includes asphaltene rich hydrocarbon having average molecular weight of about 3000. The hydrocarbon is present mainly as pyrrole, porphyrine, pyridine, and amide functional groups.

In an embodiment of the present invention, the dual functional agent is present in the range of 0.5 to 10% by weight of the hybrid modified bitumen composition. In another embodiment of the invention, the functionalized polymer is a copolymer having ethylene back bone and side chains having functional groups. The functional groups comprise methacrylates, butyl acrylates, vinyl ether, Glycidyl methacrylate and Glycidyl vinyl ether. In an embodiment, the functionalized polymer is present in the range of 0.1 to 3% by weight of the hybrid modified bitumen composition. The hybrid modified bitumen composition of the present invention has enhanced penetration at 25° C. of 44-49, enhanced softening point of 62-67, enhanced elastic recovery of 71-77, enhanced viscosity at 150° C. of 3-9 Poise and enhanced storage stability of 1-3.

The present invention also relates to a single step process for the preparation of hybrid modified bitumen composition comprising:
(a) heating vacuum residue to an elevated temperature;
(b) adding dual functional agent to heated asphalt of step (a);
(c) dispersing the mixture of asphalt and dual functional agent of step (b) homogeneously with an agitator for half an hour to form a heated modified residue;
(d) adding crumb rubber and functionalized polymer to heated modified residue of step (c);
(e) stirring the slurry of step (d) with an agitator to obtain hybrid modified bitumen composition.

In an embodiment of the invention, the vacuum residue comprises asphalt/bitumen having a penetration range of 50 to 150 dmm. Preferably, the vacuum residue has a penetration range of 70 to 150 dmm. In another embodiment of the invention, the vacuum residue in step (a) is heated to a temperature range of 150° C. to 190° C. In a preferred embodiment, crumb rubber is added to the heated modified residue of step (d) in concentrations of 1 to 20% by weight of the hybrid modified bitumen composition. In a preferred embodiment of the invention, functionalized polymer is added to the heated modified residue of step (d) in concentrations of 0.1 to 3% by weight of the hybrid modified bitumen composition. The stirring in step (e) is for 2 to 4 hours.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternatives falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The terms "comprises", "comprising", or any other variations thereof, are intended to cover a non-exclusive inclusion, such that one or more processes or composition/s or systems or methods proceeded by "comprises . . . a" does not, without more constraints, preclude the existence of other processes, sub-processes, composition, sub-compositions, minor or major compositions or other elements or other structures or additional processes or compositions or additional elements or additional features or additional characteristics or additional attributes.

Definitions

For the purposes of this invention, the following terms will have the meaning as specified therein:

Petroleum vacuum residue—Petroleum vacuum residue comprises asphalt/bitumen bearing a penetration range from 50 to 150 dmm.

Crumb rubber—Crumb rubber may be obtained from grinding of used truck tires or automobile tires, or from any other appropriate source of ground rubber. Synthetic rubber may also be used.

Dual functional/functionalizing agent—Dual functional agent may be defined as aromatic hydrocarbon rich compound having high molecular weight with carbon number more than 40 containing reactive nitrogen hetero ring aromatics.

Functionalized polymers—Functionalized polymer includes ethylene or propylene back bone with side chain having functional groups like acrylates, methacrylates, butyl acrylates, vinyl ether, glycidyl methacrylate, glycidyl vinyl ether, epoxides etc.

Penetration—Penetration Test determines the hardness of Bitumen by measuring the depth (in tenths of a mm) to which a standard, and loaded needle will vertically penetrate in 5 seconds, a sample of bitumen maintained at a temperature of 25° C. (77 deg F.).

The present invention discloses a hybrid modified bitumen composition which employs a combination of functionalized polymer, crumb rubber along with dual functional agent in petroleum vacuum residue, which increases the storage stability and hardening of the bitumen composition. More particularly, a hybrid modified bitumen composition is disclosed which overcomes the problems of anchoring and is used in preparation of storage stable hybrid modified bitumen. The present invention also discloses a method of preparation of hybrid modified bitumen containing functionalized polymer, crumb rubber and a dual functional agent.

Waste tire rubbers have become a significant component of solid waste material and being an elastomer with high molecular weight encouraged the researchers to use waste tire rubbers in bitumen to obtain cost effective modified bitumen with improved resistance to low temperature cracks and aging of asphalt pavement. This process of incorporation of waste tire rubber in bitumen can also promote reuse of waste rubber and protect environment from hazardous materials.

However, research shows that crumb rubber is easily separated from the bitumen and settled at the bottom of container. Therefore, the high temperature storage stability of crumb rubber modified bitumen is very poor which discourages its use in bitumen.

Various types of polymers have been used to improve the storage stability of the crumb rubber modified bitumen. It is known in the art that storage stability can be increased by predispersing and swelling the polymer in oils before adding it to the bitumen modified with crumb rubber. However, the production of all grades of modified bitumen (as per 15462: 2004/IRC: SP: 53-2010 and ASTM D6373-07) from petroleum vacuum residue is neither feasible nor cost effective.

To solve storage stability problem and to make cost effective modified bitumen by adding waste crumb rubber in bitumen, it has been disclosed that the use of dual functional agent which may react with crumb rubber leading to enhanced storage stability of hybrid modified bitumen in one aspect and in another aspect it increases the hardening of bitumen. Dual functionalizing agent maintains the dual properties i.e., storage stability and hardening in one hybrid modified bitumen product which is at par with all grades of polymer modified bitumen, crumb rubber modified bitumen as per 15462:2004/IRC: SP: 53-201 and ASTM D6373-07 specification, so called hybrid modified bitumen.

In accordance with the present invention, a hybrid modified bitumen composition is disclosed comprising a petroleum vacuum residue, waste crumb rubber or synthetic rubber, a dual functional agent and a functionalized polymer. In an embodiment, the vacuum residue is produced from high sulphur crude or low sulphur crude or mixture thereof. In another embodiment of the present invention, the vacuum residue has a penetration in the range of 50 to 150 dmm. Preferably the vacuum residue has a penetration in the range of 70 to 150 dmm.

In an embodiment of the present invention, the crumb rubber is obtained from grinding of used truck tires or automobile tires or from any other appropriate source of ground rubber. In another embodiment, the crumb rubber or synthetic rubber is present in the range of 1-20% by weight of the hybrid modified bitumen composition. In an embodiment, the crumb rubber is preferably composed of polyisoprene. The dual functional agent, in accordance with the present invention, comprises nitrogen containing hetero ring annulated reactive aromatic hydrocarbons having high melting point in the range of 140-160° C., including but not limited to asphaltene rich hydrocarbon having average molecular weight of about 3000 with high nitrogen content, which is present mainly as pyrrole, porphyrine, pyridine, and amide functional groups. In an embodiment, the dual functional agent is present in the range of 0.5-10% by weight of the hybrid modified bitumen composition.

The functionalized polymer, used in accordance with the present invention, is a copolymer having ethylene back bone and side chains having functional groups wherein the functional groups comprise methacrylates, butyl acrylates, vinyl ether, glycidyl methacrylate and glycidyl vinyl ether. In an embodiment the functionalized polymer is present in the range of 0.1-3% by weight of the hybrid modified bitumen composition.

Without being bound by the theory, it is believed that the dual functional agent may act as a catalyst for opening of the epoxides ring of the functionalized polymer. The interaction of dual functional agent and crumb rubber increases the hardness and storage stability of the product. Addition of dual functional agent to the composition may also expose more active sites for the functionalized polymer thereby further enhancing the storage stability of the product.

Present invention provides a process for preparing a hybrid modified bitumen composition. In an embodiment, the hybrid modified bitumen according to the present invention is produced directly from petroleum residue in a single step by incorporating waste crumb rubber, a dual functional agent and functionalized polymer in bitumen. It has been disclosed that the use of dual functional agent, which may react with crumb rubber, leads to enhanced storage stability of hybrid modified bitumen in one aspect, and in another way, it increases the hardening of bitumen. Dual functionalizing agent maintains the dual properties i.e., storage stability and hardening in one hybrid modified bitumen product.

The present invention provides a single step process for the production of hybrid modified bitumen with higher performance grade and better rheological properties from vacuum residue without using blowing in refinery processing which leads to energy saving during processing. Several blends with various compositions of dual functional agent, crumb rubber and functionalized polymer have been prepared to get hybrid modified bitumen product.

Present invention provides a process for preparing a hybrid modified bitumen composition using petroleum vacuum residue. In an embodiment, dual functional agent is added to heated asphalt in concentrations of 0.5-10% by weight of the hybrid modified bitumen composition, and the mixture is dispersed homogenously with the help of agitator for half to one hour. Crumb rubber or synthetic rubber in concentrations of 1-20% by weight of the hybrid modified bitumen composition and functionalized polymer in concentrations of 0.1-3% by weight of the hybrid modified bitumen composition, are slowly added to heated modified residue without any time lag and mixed properly with the help of an agitator for 2 to 4 hrs. In an embodiment, the process is carried at 160-190° C.

In an embodiment, the vacuum residue used in said process is produced from high sulphur crude or low sulphur crude or mixture thereof. In another embodiment of the present invention, the vacuum residue has a penetration in the range of 50 to 150 dmm. Preferably, the vacuum residue has a penetration range of 70 to 150 dmm.

In an embodiment of the present invention, the crumb rubber is obtained from grinding of used truck tires or automobile tires or from any other appropriate source of ground rubber. In another embodiment, the crumb rubber or synthetic rubber is present in the range of 1-20% by weight of the hybrid modified bitumen composition. In an embodiment, the crumb rubber is preferably composed of polyisoprene. The dual functional agent, in accordance with the present invention, comprises nitrogen containing hetero ring annulated reactive aromatic hydrocarbons having high melting point, in the range of 140-160° C., including but not limited to asphaltene rich hydrocarbon having average molecular weight of about 3000 with high nitrogen content, which is present mainly as pyrrole, porphyrine, pyridine, and amide functional groups. In an embodiment, the dual functional agent is present in the range of 0.5-10% by weight of the hybrid modified bitumen composition.

The functionalized polymer, used in accordance with the present invention, is a copolymer having ethylene back bone and side chains having functional groups wherein the functional groups comprise methacrylates, butyl acrylates, vinyl ether, glycidyl methacrylate and glycidyl vinyl ether. In an embodiment the functionalized polymer is present in the range of 0.1-3% by weight of the hybrid modified bitumen composition.

The developed hybrid modified bitumen product in the present invention was evaluated for several physical and rheological properties by using various test methods and it has been found that the developed hybrid modified bitumen has higher performance grade and better rheological properties as compared to polymer modified or crumb rubber modified bitumen.

An aspect of the present invention is directed to the interaction of dual functional agent with crumb rubber which may further enhance the interaction of crumb rubber to provide modified bitumen with high storage stability. Another aspect of the invention is to provide hybrid modified bitumen composition from various components without using milling operation. Yet another aspect of the invention is the production of hybrid modified bitumen from waste tire rubber which further provides an alternate way for the disposal of waste tire keeping the environment free of pollution and hazardous materials.

An aspect of the present invention is to enhance the composition of waste crumb rubber in asphalt to get cost effective hybrid modified bitumen. Furthermore, the present invention is directed to the production of high performance grade hybrid modified bitumen with desired penetration range with elastic recovery more than 70 as per IS: 15462-2004 for elastomeric polymer and crumb rubber modified bitumen specification.

Having described the basic aspects of the present invention, the following non-limiting examples illustrate specific embodiments thereof.

Example-1

Effect of the components Crumb Rubber, Dual Functionalized Agent (DFA), and Functionalized polymer when penetration range is 40 and when penetration range is more than 150.

Asphalt was heated to 170±5° C. Dual functional agent was added slowly and stirring was continued for 30 min. Crumb rubber and functionalized polymer was also added slowly (one by one) without any lag time lag. Stirring was continued for another 4 hrs. Then sample was drawn and following test was conducted to monitor the formation of hybrid modified bitumen.

TABLE 1

| S.N. | Vacuum Residue | Crumb Rubber (%) | DFA (%) | Functionalized Polymer (%) | Penetration | Results | Inference |
|---|---|---|---|---|---|---|---|
| 1. | (Pen: 40) | 10 | 2 | 0.5 | <30 | — | Fail |
| 2. | (Pen: 160) | 10 | 2 | 3 | >50 | Gelling Occurs | Fail |

Inference: Test result does not meet the requirement of hybrid modified bitumen at penetration range 40. Further, test result does not meet the requirement of hybrid modified bitumen if the Penetration range is increased beyond 150.

Example-2

Effect of the components Crumb Rubber, Dual Functionalized Agent (DFA), and Functionalized polymer when penetration range is 80 to 100

In Table 2, in the first experiment the inventors experimented with a process for preparing a composition in the present invention comprising:

1. 87.7 weight percent, based upon the composition, of asphalt having penetration range 80-100 dmm.
2. 2 weight percent, based upon the composition, of dual functional agent.
3. 10 weight percent, based upon the composition, of crumb rubber.
4. 0.3 weight percent, based upon the composition, of functionalized polymer.

Asphalt was heated to 170±5° C. Dual functional agent was added slowly and stirring was continued for 30 min. Crumb rubber and functionalized polymer was also added slowly (one by one). Stirring was continued for another 4 hrs. Then sample was drawn and following test was conducted to monitor the formation of hybrid modified bitumen.

In Table 2, in the second experiment the inventors experimented with a process for preparing a composition in the present invention comprising:
1. 87.5 weight percent, based upon the composition, of asphalt having penetration range 80-100 dmm.
2. 2 weight percent, based upon the composition, of dual functional agent.
3. 10 weight percent, based upon the composition, of crumb rubber.
4. 0.5 weight percent, based upon the composition, of functionalized polymer.

Asphalt was heated to 170±5° C. Dual functional agent was added slowly and stirring was continued for 30 min. Crumb rubber and functionalized polymer was also added slowly (one by one) without any lag time lag. Stirring was continued for another 4 hrs. Then sample was drawn and following test was conducted to monitor the formation of hybrid modified bitumen.

In Table 2, in the third experiment the inventors experimented with a process for preparing a composition in the present invention comprising:
1. 85.6 weight percent, based upon the composition, of asphalt having penetration range 80-100 dmm.
2. 2 weight percent, based upon the composition, of dual functional agent.
3. 12 weight percent, based upon the composition, of crumb rubber.
4. 0.4 weight percent, based upon the composition, of functionalized polymer.

Asphalt was heated to 170±5° C. Dual functional agent was added slowly and stirring was continued for 30 min. Crumb rubber and functionalized polymer was also added slowly (one by one) without any lag time lag. Stirring was continued for another 4 hrs. Then sample was drawn and following test was conducted to monitor the formation of hybrid modified bitumen.

TABLE 2

| S.N. | Asphalt | DFA | Crumb Rubber | Functionalized Polymer (%) | Soft. Pt. | Penetration | Elastic Recovery | Inference |
|---|---|---|---|---|---|---|---|---|
| 1. | (Pen: 80-100) | 2 | 10 | 0.3 | 62 | 45 | 72 | Pass |
| 2. | (Pen: 80-100) | 2 | 10 | 0.5 | 62.5 | 46 | 73 | Pass |
| 3. | (Pen: 80-100) | 2 | 12 | 0.4 | 63.7 | 45 | 78 | Pass |

Inference: In the three experiments of Table 2, test results meet the requirements of hybrid modified bitumen if the Penetration range is between 80 to 100.

Conclusion from Inferences Derived from Examples 1 and 2

It can be concluded from the results of Examples 1 and 2 that when the Crumb Rubber, Dual Functional Agent (DFA) and functionalized polymer are applied to asphalt/bitumen having penetration range beyond the range of 50 and 150, as shown in the two experiments of Example 1, the results do not meet the requirements of hybrid modified bitumen. However, when the penetration range of asphalt/bitumen is selected within the range 50 to 150 (in the three experiments of Example 2, where a non-limiting range of 80 to 100 has been taken), the test results meet the requirements of hybrid modified bitumen.

Example-3

Effect on storage stability due to the addition of crumb rubber in vacuum residue.

Vacuum residue comprises asphalt/bitumen bearing a penetration range from 70 to 150.

Crumb rubber may be obtained from grinding of used truck tires or automobile tires, or from any other appropriate source of ground rubber.

W.S: Without Sieving

Neat asphalt was heated to a temperature range between 150° C. to 190° C. Then 10% crumb rubber was added to it and then mixed homogenously with the help of agitator for 2-4 hours with in a temperature range between 165° C. to about 170° C. The test data for separation difference in softening point without sieving as shown below in Table 3.

TABLE 3

| S.N. | Vacuum Residue (Pen-80-100) | Crumb Rubber (%) | S.S (Diff. in upper and lower soft. pt) (° C.), (W.S) (Storage Stability) |
|---|---|---|---|
| 1. | do | 10 | 8 |

Inference: Test data shows that storage stability of asphalt with 10% Crumb rubber is very poor.

Example-4

Effect on storage stability due to the addition of crumb rubber along with dual functional agent in vacuum residue.

Dual functional agent includes hetero ring annulated reactive polycyclic aromatic hydrocarbon having high melting point.

Neat asphalt was heated to a temperature range between 150° C. to 190° C. Then 2% dual functional agent was added and mixed for 30 minutes and then 10% crumb rubber was added to it and mixed with the help of agitator for 4 hours with in a temperature range between 165° C. to about 170° C. The test data for softening point (without sieving) as shown below in Table 4.

TABLE 4

| Vacuum Residue (Pen-80-100) | Crumb Rubber (%) | Dual functional Agent (%) | S.S (Diff. in upper and lower soft. pt) (° C.), (W.S) (Storage Stability) |
| --- | --- | --- | --- |
| do | 10 | 2 | 4 |

Inference: Result of test data of above table shows that storage stability of developed product was improved with the addition of dual functional agent along with crumb rubber in vacuum residue.

Example-5

Effect on storage stability due to the addition of dual functional agent along with the combination of crumb rubber and functionalized polymer in vacuum residue. Functionalized polymer includes ethylene, propylene back bone and side chains having functional groups like acrylates, methacrylates, butyl acrylates, vinyl ether, glycidyl methacrylate, glycidyl vinyl ether etc.

Neat asphalt was heated to a temperature range between 150° C. to 190° C. Then 2% dual functional agent was added and mixed for 30 minutes Then 10% crumb rubber and 0.5% functionalized polymer was added slowly without any time lag to it and mixed homogenously with the help of agitator for 4 hr with in a temperature range between 165° C. to 170° C. The test data for softening point (without sieving) as shown below in Table 5.

TABLE 5

| S.N. | Vacuum Residue (Pen-80-100) | Dual functional Agent (%) | Crumb Rubber (%) | Func. Polymer | S.S (Diff. in upper and lower soft. pt) (° C.), (W.S) (Storage Stability) |
| --- | --- | --- | --- | --- | --- |
| 1. | do | 2 | 10 | 0.5 | 1 |

Inference: Result of test data of above table shows that storage stability of developed product further improved with the addition of dual functional agent and functionalized polymer along with crumb rubber in vacuum residue. Product developed with the combination of dual functional agent and functionalized polymer possesses very high storage stability.

Example-6

Effect on penetration due to the addition of dual functional agent or functionalized polymer along with the crumb rubber in asphalt.

Incorporation of dual functional agent along with the combination of crumb rubber and functionalized polymer lower down the penetration and produces hybrid modified bitumen with improved high temperature rutting resistance properties.

TABLE 6

| S.N. | Vacuum Residue | Dual functional Agent (%) | Crumb Rubber (%) | Func. Polymer | Penetration |
| --- | --- | --- | --- | --- | --- |
| 1. | Pen-80-100 | 0 | 10 | 0.5 | 58 |
| 2. | Pen-80-100 | 2 | 10 | 0 | 44 |

Example-7

Synergistic effect on softening point due to the addition of dual functional agent along with the combination of crumb rubber and functionalized polymer in asphalt.

According to present invention, as we claim the effect of dual functional agent along with the combination of crumb rubber and functionalized polymer shows synergistic effect on softening point as shown below.

The data shown in table indicates the interaction of dual functional agent with crumb rubber and further interaction of crumb rubber with functionalized polymer as with enhancing softening point as shown below in Table 7.

TABLE 7

| S.N. | Vacuum Residue | Dual functional Agent (%) | Crumb Rubber (%) | Functionalized Polymer | Softening point, (° C.) |
| --- | --- | --- | --- | --- | --- |
| 1. | Pen-80-100 | 0 | 10 | 0.5 | 58 |
| 2. | Pen-80-100 | 2 | 10 | 0 | 59 |
| 3. | Pen-80-100 | 2 | 10 | 0.5 | 62 |

Example-8

Hybrid modified bitumen produced in the present invention is better than all grades of modified bitumen and meets with all modified bitumen specifications as per IS 15462:2004/IRC: SP: 53-2010 and ASTM D6373-07.

All grades of PMB, CRMB as per 15462:2004/IRC: SP: 53-2010 and ASTM D6373-07 specification can be prepared by using dual functional agent along with crumb rubber and functionalized polymer in vacuum residue without blowing process. The test data of developed hybrid modified bitumen product and its comparison with polymer modified/crumb rubber modified bitumen is shown in Table 8.

TABLE 8

| S.N. | Property | Hybrid Bitumen (Test data for desired product) | PMB- As per Type-B, IS: 15462-2004 | CRMB- As per IS: 15462-2004 for CRMB-60 |
|---|---|---|---|---|
| 1. | Penetration at 25° C., 1/10 mm, 5 sec. | 44 | 45 | 46 |
| 2. | Softening point, (R&B), ° C. | 62 | 66 | 61 |
| 3. | Elastic Recovery of half thread in ductilometer at 15° C. | 75 | 74 | 52 |
| 4. | Viscosity at 150° C., Poise | 6 | 5.4 | 6.4 |
| 5. | Separation Test (Difference in softening point, (R&B)° C. | 1 (without sieving) | 1 | 3.9 (with sieving) |

Similarly all other hybrid bituminous products can be prepared by optimizing the composition of all components to be used in present invention which have better properties than all other grades of PMB, CRMB as per 15462:2004/IRC: SP: 53-2010 and ASTM D6373-07.

Example-9

High performance grade and superior rheological properties of hybrid modified bitumen as compared to PMB-40 and CRMB-60.

DSR: Dynamic Shear Rheometer
RTFO: Rotating Thin Film Oven
PAV: Pressure Aging Vessel BBR: Bending Beam Rheometer (for bending beam creep stiffness test)

Dynamic Shear, ASTM D7175, is determined both before and after simulated aging in the Rolling Thin Film Oven (RTFO) test to determine a minimum binder stiffness as exhibited in freshly paved roads up to one year in age and after the Pressure Aging Vessel (PAV) test to determine the maximum binder stiffness as exhibited in a pavement up to 5 or more years of age.

Bending Beam Creep Stiffness, ASTM D 6648, is determined after RTFO and PAV aging to determine the low thermal cracking of asphalt. The Bending Beam Creep Stiffness test measures low temperature stiffness characteristics. A 12.7 cm×0.6 cm×1.3 cm (5"×1/4"×1/2") beam of binder material is molded, cooled to testing temperature, and subjected to an imposed weight load.

Load versus deflection data is collected for 240 seconds. The low temperature specification values are based on the stiffness value determined at 60 seconds and the absolute value of the slope (m-value) of the time vs. log (Stiffness) curve determined at 60 seconds. According to present invention, as we claim the effect of dual functional agent along with the combination of crumb rubber and functionalized polymer shows better rheological properties as compared to other PMB-40 and CRMB-60 as shown in Table 9.

TABLE 9

| S.N. | Property | Hybrid-40 | Hybrid-70 | PMB-40 (SBS) | PMB-40 (Elvaloy) | CRMB-60 |
|---|---|---|---|---|---|---|
| 1. | Performance Grade | 82-28 | 72-22 | 76-22 | 76-22 | 76-22 |
| 2. | (Rutting Properties) DSR-Original Binder, G*/Sin δ-Value(KPa) | 1.11 at 88° C. | 1.16 at 72° C. | 1.71 at 76° C. | 1.22 at 82° C. | 1.09 at 82° C. |
| 3. | (Rutting Properties) DSR-(After-RTFO), G*/Sin δ-Value(KPa) | 2.74 at 82° C. | 2.07 At 72° C. | 2.59 At 76° C. | 2.45 at 76° C. | 3.26 at 76° C. |
| 4. | Fatigue Characteristics (After-PAV) G* × Sin δ-Value(KPa) | 4970 at 13° C. | 4986 at 19° C. | 4080 at 22° C. | 4150 at 22° C. | 4890 at 16° C. |
| 5. | Low Temp. Thermal Cracking BBR (After-PAV) m-Value/Estimated Stiffness | 0.31/147 at −18° C. | 0.30/170 at −12° C. | 0.30/160 at −12° C. | 0.31/150 at −12° C. | 0.31/152 at −12° C. |

We claim:

1. A hybrid modified bitumen composition comprising:
   (a) a petroleum vacuum residue;
   (b) crumb rubber or synthetic rubber in a range of 1 to 20%;
   (c) a dual functional agent comprising nitrogen containing hetero ring annulated reactive aromatic hydrocarbons having high melting point in a range of 140 to 160° C.; and
   (d) a functionalized polymer in the range of 0.1-3%.

2. A hybrid modified bitumen composition of claim 1 wherein the petroleum vacuum residue comprises asphalt/bitumen having a penetration in the range of 50 to 150 dmm, or 70 to 150 dmm.

3. A hybrid modified bitumen composition of claim 1 wherein the crumb rubber comprises polyisoprene.

4. A hybrid modified bitumen composition of claim 1, wherein the nitrogen containing hetero ring annulated reactive aromatic hydrocarbon includes asphaltene rich hydrocarbon having average molecular weight of about 3000.

5. A hybrid modified bitumen composition of claim 1, wherein the dual functional agent is present in the range of 0.5 to 10%.

6. A hybrid modified bitumen composition of claim 1, wherein the functionalized polymer is a copolymer having ethylene back bone and side chains having functional groups.

7. The hybrid modified bitumen composition of claim 1 having enhanced penetration at 25° C. of 44-49, enhanced softening point of 62-67, enhanced elastic recovery of 71-77, enhanced viscosity at 150° C. of 3-9 Poise and enhanced storage stability of 1-3.

8. A single step process for the preparation of hybrid modified bitumen composition of claim 1, the process comprising:

(a) heating petroleum vacuum residue to an elevated temperature;

(b) adding dual functional agent comprising nitrogen containing hetero ring annulated reactive aromatic hydrocarbons having high melting point in a range of 140 to 160° C. to the heated petroleum vacuum residue of step (a);

(c) dispersing the mixture of vacuum residue and dual functional agent of step (b) homogeneously with an agitator for half an hour to form a heated modified residue;

(d) adding crumb rubber or synthetic rubber in a range of 1 to 20% and functionalized polymer in a range of 0.1 to 3% to the heated modified residue of step (c); and (e) stirring the slurry of step (d) with an agitator to obtain hybrid modified bitumen composition.

9. The single step process of claim 8, wherein the petroleum vacuum residue comprises asphalt/bitumen having a penetration range of 50 to 150 dmm.

10. The single step process of claim 8, wherein the petroleum vacuum residue in step (a) is heated to a temperature range of 150° C. to 190° C.

11. The single step process of claim 8, wherein the stirring in step (e) is for 2 to 4 hours.

* * * * *